(12) United States Patent
Onuma et al.

(10) Patent No.: US 6,846,582 B2
(45) Date of Patent: Jan. 25, 2005

(54) MAGNETIC RECORDING MEDIUM, METHOD FOR PRODUCING THE SAME, AND MAGNETIC STORAGE APPARATUS

(75) Inventors: Tsuyoshi Onuma, Moriya (JP); Akira Yano, Moriya (JP); Satoshi Matsunuma, Kamakura (JP); Takanobu Takayama, Toride (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/292,469

(22) Filed: Nov. 13, 2002

(65) Prior Publication Data

US 2003/0104252 A1 Jun. 5, 2003

(30) Foreign Application Priority Data

Nov. 16, 2001 (JP) .......................................... 2001-352040

(51) Int. Cl.$^7$ .............................. G11B 5/66; G11B 5/70; B32B 15/01; C25D 5/26
(52) U.S. Cl. ........................ 428/694 TS; 428/694 TM; 428/336; 428/212; 428/900; 428/668; 428/670
(58) Field of Search .................... 428/694 TM, 694 TS, 428/336, 212, 900, 668, 670

(56) References Cited

U.S. PATENT DOCUMENTS

| | | | | |
|---|---|---|---|---|
| 5,587,235 A | * | 12/1996 | Suzuki et al. | ............... 428/332 |
| 6,537,638 B2 | * | 3/2003 | Do et al. | ................... 428/65.3 |
| 6,596,418 B2 | * | 7/2003 | Maesaka et al. | ......... 428/694 T |
| 2002/0015864 A1 | | 2/2002 | Maesaka et al. | ..... 428/694 TM |

FOREIGN PATENT DOCUMENTS

| | | |
|---|---|---|
| JP | A 1-320619 | 12/1989 |
| JP | A 2-235215 | 9/1990 |
| JP | A 4-311809 | 11/1992 |
| JP | A 7-73429 | 3/1995 |
| JP | A 7-176027 | 7/1995 |
| JP | A 8-30951 | 2/1996 |
| JP | A 2001-014633 | 1/2001 |
| JP | A 2001-155329 | 6/2001 |
| JP | A 2002-25030 | 1/2002 |
| JP | A 2002-25032 | 1/2002 |
| JP | A 2002-352408 | 12/2002 |
| JP | A 2002-352409 | 12/2002 |
| JP | A 2002-358627 | 12/2002 |

OTHER PUBLICATIONS

Ohmori et al., "Study of noise for Co/Pd multiplayer perpendicular recording media", Annual Conference on Magnetics in Japan held by Magnetics Society of Japan, 2000.
Judy et al., AIT–MINT Workshop, 2001.

* cited by examiner

Primary Examiner—Holly Rickman
(74) Attorney, Agent, or Firm—Oliff & Berridge, PLC

(57) ABSTRACT

A magnetic recording medium 100 comprises, on a substrate 1, a soft magnetic layer 3, a seed layer 5, and a recording layer 6 having an artificial lattice structure. The seed layer 5 is formed of Pd and one selected from the group consisting of Si, B, C, and Zr. Accordingly, the magnetic exchange coupling force of the recording layer 6 in the in-plane direction can be weakened. Minute recording magnetic domains can be formed in the recording layer 6, and the magnetization transition area is distinct as well. Thus, the medium noise is reduced. That is, reproduction can be performed with a low medium noise even when information is recorded at a high density. A magnetic storage apparatus, which is provided with the magnetic recording medium as described above, can achieve an areal recording density of 150 Gigabits/square inch.

24 Claims, 6 Drawing Sheets

MAGNETIC RECORDING MEDIUM, METHOD FOR PRODUCING THE SAME, AND MAGNETIC STORAGE APPARATUS

BACKGROUND OF INVENTION

1. Field of the Invention

The present invention relates to a magnetic recording medium and a magnetic storage apparatus based on the use of the same. In particular, the present invention relates to a magnetic recording medium which is usable to record a large amount of information quickly and correctly and reproduce recorded information at a low noise level. The present invention also relates to a method for producing the same and a magnetic storage apparatus based on the use of the same.

2. Description of the Related Art

In recent years, in response to the development of advanced information society, the needs increasingly expand for the realization of the large capacity and the high density of the information recording apparatus. The magnetic storage apparatus is known as one of information recording apparatuses which respond to such needs. The magnetic storage apparatus is used, for example, as the large capacity storage apparatus, for example, for large scale servers, parallel computers, personal computers, network servers, movie servers, and mobile PC's. The magnetic recording apparatus is provided with a magnetic recording medium on which information is recorded, and a magnetic head which is used to record and reproduce information on the magnetic recording medium. The magnetic recording medium includes a ferromagnetic thin film composed of cobalt alloy or the like which is formed as a recording layer on a disk-shaped substrate, for example, by means of the sputtering method. A protective layer and a lubricating film are formed on the recording layer in order to enhance the sliding resistance and the corrosion resistance.

As the magnetic recording apparatus has a large capacity, the improvement in recording density is advanced for the magnetic recording medium by recording minute recording magnetic domains in the recording layer of the magnetic recording medium. The perpendicular magnetic recording system attracts attention as a method for minutely recording the recording magnetic domains. In the perpendicular magnetic recording system, the magnetic recording is performed by forming magnetic domains having perpendicular magnetism in a recording layer by using a magnetic recording medium having the recording layer which exhibits the perpendicular magnetism. In the perpendicular magnetic recording system as described above, the minute magnetic domains can be formed in the recording layer, and hence the recording density of the magnetic recording medium can be increased.

A polycrystalline film based on the Co—Cr system has been hitherto used as a material for the recording layer of the magnetic recording medium which conforms to the perpendicular magnetic recording system as described above. The polycrystalline film has a structure in which the ferromagnetic Co-rich areas and the non-magnetic Cr-rich areas are separated from each other, and the non-magnetic area interrupts the magnetic interaction which would otherwise act between the adjoining ferromagnetic areas.

In order to further improve the areal recording density of the magnetic recording medium, it is necessary to reduce the medium noise. For this purpose, it is known to be effective that the unit of inversion of magnetization is made fine and minute and the reading head is supersensitized. Especially, in order to make the unit of inversion of magnetization to be fine and minute, it is known to be effective that the magnetic crystal grains are made fine and minute. However, if the magnetic crystal grains are made excessively fine and minute, the so-called thermal demagnetization is consequently caused, in which the state of magnetization of the magnetic crystal grains is thermally unstable. In order to avoid such an inconvenience, for example, Japanese Patent Application Laid-open No. 8-30951 discloses a magnetic recording medium comprising a soft magnetic layer, a first seed layer composed of carbon, a second seed layer, and a recording film having an artificial lattice structure which are successively stacked on a non-magnetic substrate in this order.

The artificial lattice multilayer film and the superlattice alloy film have high magnetic anisotropy. Therefore, a high resistance is expected with respect to the thermal disturbance. However, these films have such a drawback that small magnetic domains cannot be formed and the transitional medium noise is large, because the magnetic interaction is intensive in the in-plane direction (direction parallel to the substrate surface) unlike the polycrystalline film based on the Co—Cr system. In the magnetic recording medium disclosed in Japanese Patent Application Laid-open No. 8-30951 described above, the second seed layer composed of Pt or Pd is provided on the first seed layer composed of carbon formed on the soft magnetic layer, and the artificial lattice layer of Co/Pt or Co/Pd is formed thereon. Accordingly, the crystalline orientation of the artificial lattice layer is improved, the perpendicular magnetic anisotropy is enhanced, and the coercivity is improved. However, in the case of such a magnetic recording medium, the magnetic exchange coupling force in the in-plane direction of the recording layer is intensified, and the transition noise, which appears as the jitter when the track recording density is increased, becomes high. As a result, it is difficult to perform recording and reproduction at a high recording density. Further, the following problem arises. That is, the writing magnetic field from the magnetic head does not effectively arrive at the soft magnetic layer, and the saturation recording characteristics are inferior, because the two seed layers, i.e., the first seed layer and the second seed layer are used.

In the 24th Annual Conference on Magnetics in Japan (2000) held by Magnetics Society of Japan, Omori et al. disclose a magnetic recording medium which uses Au—$SiO_2$ and PdB—O as a seed layer on a substrate and which uses an artificial lattice layer composed of CoB—O layers and PdB—O layers as a recording layer.

In AIT-MINT Workshop 2001, Jack H. Judy et al. disclose a magnetic recording medium which uses ITO (Indium-Tin-Oxide)/Pd as a seed layer and which uses an artificial lattice layer composed of CoB layers and Pd layers as a recording layer.

SUMMARY OF THE INVENTION

The present invention has been made in order to solve the problems involved in the conventional technique as described above, an object of which is to provide a magnetic recording medium in which the magnetic exchange coupling force of a recording layer in the in-plane direction is low and the transition noise is reduced.

Another object of the present invention is to provide a magnetic storage apparatus which has excellent thermal disturbance resistance and which is capable of reproducing information at a high S/N level even when the information is recorded at a high areal recording density.

According to a first aspect of the present invention, there is provided a magnetic recording medium comprising:
- a substrate;
- a seed layer which is formed directly or indirectly on the substrate, and which is formed of Pd and at least one selected from the group consisting of Si, B, C and Zr; and
- a magnetic recording layer which is formed directly on the seed layer, and which is formed by alternately stacking a Co layer and a platinum group layer composed of at least one of Pt and Pd.

According to a second aspect of the present invention, there is provided a magnetic recording medium comprising:
- a substrate;
- a seed layer which is formed directly or indirectly on the substrate, and which is formed of Pd and at least one selected from the group consisting of Si, B, C and Zr; and
- a magnetic recording layer which is formed directly on the seed layer and which is formed by alternately stacking a Co layer and a platinum group layer composed of at least one of Pt and Pd, the magnetic recording layer containing no oxygen.

The magnetic recording medium of the present invention comprises, as the underlying base for the recording layer, the seed layer composed of the Pd element and the at least one element selected from the group consisting of Si, B, C, and Zr. It is especially preferable that the seed layer is formed of Pd and Si or Pd and B. When the seed layer is formed of Pd and Si, it is desirable that the seed layer is formed of 50 atomic % to 90 atomic % Pd and 10 atomic % to 50 atomic % Si. When the seed layer is formed of Pd and B, it is preferable that the seed layer is formed of 40 atomic % to 80 atomic % Pd and 20 atomic % to 60 atomic % B. It is preferable that the seed layer has a microcrystalline structure or a structure including amorphous parts existing in a microcrystalline structure.

In the present invention, the seed layer makes it possible to optimally control the crystalline orientation of the recording layer formed thereon. For example, if the seed layer is formed of only Pd crystals, then a recording layer with indistinct grain boundary is formed on an intermediate layer, and the magnetic exchange coupling force in the in-plane direction, which acts between the crystal grains of the recording layer, is intensified. For this reason, the recording magnetic domain to be formed in the recording layer is increased in size, and it has been impossible to form any minute recording magnetic domain. On the other hand, for example, when the seed layer is formed of Pd and Si or Pd and B, Si or B exists in Pd in a segregated manner. The recording layer, which is formed on the seed layer as described above, is grown with nuclei of Pd in the seed layer. Therefore, the distinct grain boundary is formed in the recording layer, and the magnetic exchange coupling force in the in-plane direction, which acts between the crystal grains, is reduced. The crystalline orientation of the recording layer and the exchange coupling force in the in-plane direction can be optimized by controlling the ratio of Pd to Si or Pd to B in the seed layer to have a predetermined value. Therefore, the minute recording magnetic domains can be reliably formed in the recording layer, and the magnetization transition area is distinct as well. Thus, the medium noise can be reduced. That is, the contrary characteristics, i.e., the low noise performance and the high resolution are compatible in the magnetic recording medium of the present invention.

It is desirable that the seed layer has a film thickness within a range of 1 nm to 30 nm. If the film thickness of the seed layer is less than 1 nm, it is feared that the crystalline orientation of the recording layer formed thereon cannot be controlled. As described later, when a soft magnetic layer is disposed between the substrate and the seed layer, if the film thickness is thicker than 30 nm, it is feared that the distance between the magnetic pole of the recording magnetic head and the soft magnetic layer may be increased, and the recording magnetic field from the recording magnetic head may not be applied to the recording layer sufficiently. Further, it is feared that the magnetic field from the recording magnetic head may be applied in an expanded state. As a result, the resolution may be lowered, and the disturbance in the magnetization transition area may be increased to cause any noise due to the jitter.

In the magnetic recording medium of the present invention, the recording layer is formed directly on the seed layer, and is principally composed of an element belonging to the platinum group and Co. The recording layer is an alternately stacked multilayer film obtained by alternately stacking the element belonging to the platinum group and Co in a thickness corresponding to an extent of several atoms or an extent of single atom. For example, at least one of Pt and Pd may be used as the element belonging to the platinum group. The film as described above can be formed at room temperature or at a relatively low substrate temperature, and the film has the large magnetic anisotropy. Therefore, the film is most appropriate as the recording layer for the high density recording. In the magnetic recording medium of the present invention, it is desirable that recording layer contains no oxygen. Further, it is preferable that the magnetic layer has an artificial lattice structure and exhibits perpendicular magnetization.

In this specification, the term "artificial lattice structure" means the structure which is obtained by mutually periodically stacking a plurality of different substances in one direction in a thickness corresponding to single atom or several atoms. The film, which has the artificial lattice structure as described above, is also referred to as "artificial lattice film" or "alternately stacked multilayer film".

It is desirable that the recording layer is a Co/Pd artificial lattice film formed by alternately stacking Co layers each having a film thickness selected from a range of 0.05 nm to 0.5 nm and Pd layers each having a film thickness selected from a range of 0.5 nm to 2 nm, or a Co/Pt artificial lattice film formed by alternately stacking Co layers each having a film thickness selected from a range of 0.05 nm to 0.5 nm and Pt layers each having a film thickness selected from a range of 0.1 nm to 2 nm. The perpendicular magnetic anisotropy is expressed most promptly in the artificial lattice film having the structure as described above.

When the recording layer is formed by using the Co/Pd artificial lattice layer or the Co/Pt artificial lattice layer described above in the magnetic recording medium of the present invention, an additive element may be contained in the Pd layer or the Pt layer. When the additive element is contained in the Pd layer or the Pt layer as described above, then the fluctuation arises in the composition, and it is possible to decrease the magnetic exchange coupling force in the in-plane direction of the recording layer. The additive element is desirably Si, Zr, C, or B and especially preferably B. The extent of the decrease in perpendicular magnetic anisotropy is small in the case of the addition to the Pd layer or the Pt layer as compared with the addition to the Co layer.

It is preferable that Co in the Co/Pt artificial lattice layer or the Co/Pt artificial lattice layer is distributed discontinuously in the in-plane direction. Co, which is distributed discontinuously in the artificial lattice layer, partially breaks the magnetic exchange coupling force. Therefore, it is possible to reduce the magnetic exchange coupling force in the in-plane direction of the recording layer.

The recording layer may be formed of, for example, an aggregate of cylindrical (columnar) crystal grains. The diameter of the columnar crystal grain may be 2 nm to 15 nm. The difference between the uppermost portion of the surface of the crystal grain and the lowermost portion (height position of the boundary of the crystal grain) may be 1 nm to 10 nm. The magnetic exchange coupling force in the in-plane direction is reduced in the recording layer having the structure as described above. Even when the minute magnetic domains are formed in the recording layer, then the magnetic domains exist stably, and the linear shape of the magnetization transition area is high as well. Therefore, it is possible to further reduce the noise during the reproduction.

In the present invention, the recording layer can be formed as a film by using an ordinary sputtering apparatus. For example, the recording layer can be also formed by juxtaposing two or more targets composed of different materials and alternatively moving a substrate carrier relatively with respect to the respective targets. Alternatively, the recording layer can be also formed as a film by arranging at least two types of ring-shaped targets having different diameters coaxially on an identical plane, arranging a substrate so that the substrate is opposed to the targets, and alternately effecting the electric discharge with the ring-shaped targets.

The film thickness of the recording film is preferably 5 nm to 60 nm in view of the magnetic characteristics. It is desirable for the recording layer that the coercivity, which is measured in the direction perpendicular to the substrate surface, is 1.5 [kOe] to 10 [kOe (kilooersted)]. It is desirable that (Mr·t), which is the product of the film thickness t of the recording layer and the remanent magnetization Mr, is within a range of 0.3 to 1.0 m [emu/cm$^2$]. If the coercivity is smaller than 1.5 [koe], it is feared that the output, which is obtained when information recorded at a high recording density (not less than 600 kFCI) is reproduced, may be decreased. Further, it is feared that the magnetic anisotropy energy may be decreased and the thermal demagnetization may be apt to occur. On the other hand, if the value of Mr·t is larger than 1.0 m [emu/cm$^2$], the resolution is lowered. Further, if the value of Mr·t is smaller than 0.3 m [emu/cm$^2$], the output is too small. Therefore, it is difficult to obtain sufficient recording and reproduction characteristics when the recording is performed at a high recording density of not less than 150 Gigabits/square inch.

The magnetic recording medium of the present invention may comprise a soft magnetic layer which is disposed between the substrate and the seed layer. In view of the efficient application of the magnetic field from the magnetic head to the recording layer, it is preferable for the soft magnetic layer to use a soft magnetic film having a microcrystalline structure in which nitride or carbide of at least one element selected from Ta, Nb, and Zr is uniformly dispersed in Fe. Other than the material as described above, for example, it is also allowable to use an amorphous alloy which is principally composed of Co—Zr and which contains at least one element selected from Ta, Nb, and Ti therein. The soft magnetic film as described above is suitable for the high density recording, because it has a large saturation magnetic flux density of not less than 1.5 T. Specifically, usable materials include, for example, NiFe, CoTaZr, CoNbZr, and FeTaC having a high magnetic permeability. The magnetic layer, which is composed of the material as described above, can be formed, for example, with the sputtering method or the vapor deposition to have a film thickness of not more than 1000 nm.

The magnetic recording medium of the present invention may further comprise an oxide layer containing iron oxide which is disposed between the soft magnetic layer and the seed layer. The oxide layer contains iron oxide as a major component (not less than 80% by volume of the sum total). The oxide layer as described above can be manufactured, for example, with the reactive sputtering method with iron and oxygen or the high temperature oxidation method. It is preferable that the thickness of the oxide layer containing the major component of iron oxide is not more than 30 nm in order that the recording efficiency is not lowered by the oxide layer which may behave as the magnetic spacing.

The oxide layer, which contains iron oxide as the major component, has low wettability with respect to the seed layer containing Pd and Si or Pd and B. Therefore, when the seed layer is formed on the oxide layer, then nuclei of crystal grains of the seed layer are firstly generated in a dispersed manner in an island form in the in-plane direction, and the crystal grains of the seed layer are grown respectively based on units of the nuclei generated in the dispersed manner on the oxide layer. Accordingly, an aggregate of minutely dispersed crystal grains are formed in the seed layer. Further, the crystal grains of the seed layer function as nuclei for the growth of magnetic grains of the recording layer. Therefore, when the recording layer is formed on the seed layer, the magnetic grains of the recording layer are grown individually in an isolated state by using the units of the minute crystal grains of the seed layer. Accordingly, the relatively fine magnetic grains are obtained in the recording layer. An aggregate of the extremely minute crystal grains can be formed in the recording layer extremely easily by forming the seed layer containing Pd and Si or Pd and B on the oxide layer containing iron oxide and forming the recording layer on the seed layer as described above. The minute recording magnetic domains can be formed in the recording layer, and the magnetization transition area is extremely distinct as well. Therefore, it is considered that the noise can be reduced as compared with those based on the conventional technique.

As for the substrate of the magnetic recording medium of the present invention, it is possible to use non-magnetic substrates including, for example, aluminum-magnesium alloy substrates, glass substrates, and graphite substrates. The surface of the aluminum-magnesium alloy substrate may be plated with nickel-phosphorus. The substrate surface may be treated to be flat by allowing diamond abrasive grains or abrasive tape to forcibly abut against the substrate surface while rotating the substrate. Accordingly, it is possible to improve the traveling characteristics of the magnetic head when the magnetic head is allowed to float over the magnetic recording medium. As for the centerline roughness Ra of the substrate surface, it is desirable that the centerline roughness of the protective layer formed on the substrate is not more than 1 nm. In the case of the glass substrate, the surface may be subjected to the chemical etching to be flat with a chemical such as strong acid. A low floating amount can be stably realized when a negative pressure slider is used, by chemically forming projections having minute heights, for example, not more than 1 nm on the surface.

An adhesive layer such as Ti may be formed on the substrate of the magnetic recording medium in order to improve the tight contact performance before forming the film of the soft magnetic layer.

The magnetic recording medium of the present invention may be provided with the protective layer on the recording layer. Those preferably usable for the protective layer include, for example, any one of amorphous carbon, silicon-containing amorphous carbon, nitrogen-containing amorphous carbon, boron-containing amorphous carbon, silicon oxide, zirconium oxide, and cubic system boron nitride. The method for forming the amorphous carbon protective layer includes, for example, a method in which the protective layer is formed with the sputtering with a target of graphite in an inert gas or in a mixed gas of inert gas and hydrocarbon gas such as methane, a method in which the protective layer is formed by means of the plasma CVD with an organic compound such as hydrocarbon gas, alcohol, acetone, and adamantane singly or mixed with, for example, hydrogen gas and/or inert gas, and a method in which the protective layer is formed by ionizing an organic compound and effecting acceleration by applying a voltage to make collision with the substrate. Further, the protective layer may be formed by means of the ablation method in which a high output laser beam is collected with a lens to effect radiation onto a target such as graphite.

A lubricant may be applied onto the protective layer in order to obtain good sliding resistance characteristics. Those usable as the lubricant include a perfluoropolyether-based high molecular weight lubricant having a principal chain structure composed of three elements of carbon, fluorine, and oxygen. Alternatively, a fluorine-substituted alkyl compound may be used as the lubricant. Other organic lubricants and inorganic lubricants may be also used provided that the material provides stable sliding movement and durability.

The solution-applying method is generally used as the method for forming the lubricant. In order to prevent the global warming and simplify the steps, a lubricant film may be formed by means of the photo-CVD method in which no solvent is used. The photo-CVD method is performed by radiating an ultraviolet light beam onto a gaseous raw material containing olefin fluoride and oxygen.

It is appropriate that the film thickness of the lubricant is 0.5 nm to 3 nm as an average value. If the film thickness is thinner than 0.5 nm, the lubricating characteristics are lowered, which is not preferred. If the film thickness is thicker than 3 nm, then the meniscus force is increased, and the static frictional force (stiction) between the magnetic head and the magnetic disk is increased, which is not preferred. The heat may be applied at about 100° C. for 1 to 2 hours in nitrogen or in air after forming the lubricant film. Accordingly, any excessive solvent and low molecular weight compounds can be evaporated and scattered to improve the tight contact performance between the lubricant film and the protective layer. Other than the aftertreatment as described above, for example, it is also allowable to use a method in which the ultraviolet light is radiated for a short period of time with an ultraviolet lamp after forming the lubricant film. The same or equivalent effect is also obtained by means of the method as described above.

According to a third aspect of the present invention, there is provided a magnetic recording medium comprising:
  a substrate;
  a seed layer which is formed directly or indirectly on the substrate, and which contains Pd and B; and
  a magnetic recording layer which is formed directly on the seed layer, and which contains B, and at least one of Pt and Pd,
  wherein an average concentration of B in the seed layer is higher than an average concentration of B in the recording layer, and a relationship of B1>B2 holds between a B concentration B1 at a boundary surface of the recording layer on a side of the seed layer and a B concentration B2 at an intermediate position between the boundary surface of the recording layer on the side of the seed layer and a boundary surface of the recording layer on a side opposite to the side of the seed layer. By controlling the B concentrations as described above, a part of B in the seed layer is diffused to the recording layer, the segregation of B at the crystal grain boundary in the recording layer is facilitated, and it is possible to further reduce the magnetic interaction between the crystal grains in the recording layer. In this case, it is desirable that the B concentration B1 is 17.0 to 70.0 atomic %, and the B concentration B2 is 6.0 to 17.0 atomic %. Further, it is desirable that a concentration gradient of B of 0.2 to 4.2 atomic %/nm is provided in a film thickness direction in the recording layer.

According to a fourth aspect of the present invention, there is provided a method for producing a magnetic recording medium, comprising:
  forming a seed layer containing Pd and at least one selected from a group consisting of Si, B, C and Zr directly or indirectly on a substrate; and
  forming a magnetic recording layer by alternately stacking a Co layer and a layer composed of at least one of Pt and Pd directly on the seed layer. In this method, it is desirable that Pd and B are used as materials for forming the seed layer, B is contained in the recording layer, and a condition of Bs>Br holds between a B content Bs in a material for forming the seed layer and a B content Br in a material for forming the recording layer. When the content of B in the seed layer is sufficiently larger than the content of B in the recording layer during the film formation, then a part of B in the seed layer is diffused to the recording layer, the segregation of B is facilitated at the crystal grain boundary in the recording layer, and the magnetic interaction between the crystal grains in the recording layer can be further reduced.

According to a fifth aspect of the present invention, there is provided a magnetic storage apparatus comprising:
  the magnetic recording medium according to the first aspect;
  a magnetic head which records or reproduces information; and
  a drive unit which drives the magnetic recording medium with respect to the magnetic head.

The magnetic storage apparatus of the present invention is provided with the magnetic recording medium according to the first aspect of the present invention. Therefore, even when information is recorded at a high areal recording density, the information can be reproduced at a high S/N level. Further, the magnetic storage apparatus of the present invention has excellent thermal disturbance resistance characteristics.

In the magnetic storage apparatus of the present invention, the magnetic head may comprise a recording magnetic head for recording information on the magnetic recording medium and a reproducing magnetic head for reproducing the information recorded on the magnetic recording medium. It is desirable that the gap length of the recording magnetic head is 0.2 $\mu$m to 0.02 $\mu$m. If the gap length exceeds 0.2 $\mu$m, it is difficult to perform the recording at a high track recording density of not less than 400 kFCI. On the other hand, it is difficult to produce a recording head having a gap length smaller than 0.02 $\mu$m. In the case of such a recording head, the device or element tends to be destroyed due to the induction of static electricity.

The reproducing magnetic head may be constructed with a magneto-resistance effect element. It is desirable that the reproduction shield spacing of the reproducing magnetic head is 0.2 μm to 0.02 μm. The reproduction shield spacing directly relates to the reproduction resolution. The shorter the reproduction shield spacing is, the higher the resolution is. It is desirable that the lower limit value of the reproduction shield spacing is appropriately selected within the range described above depending on, for example, the stability of the element, the reliability, the electric resistance characteristics, and the output.

In the magnetic storage apparatus of the present invention, the drive unit can be constructed with a spindle for driving and rotating the magnetic recording medium. It is desirable that the velocity of rotation of the spindle is 3000 to 20000 revolutions per minute. If the velocity is slower than 3000 revolutions per minute, the data transfer speed is lowered, which is not preferred. On the other hand, if the velocity exceeds 20000 revolutions per minute, the noise of the spindle and the heat generation are increased, which is not desirable. Taking the velocity of rotation into consideration, the optimum relative velocity between the magnetic recording medium and the magnetic head is 2 m/second to 30 m/second.

DESCRIPTION OF THE PREFERRED EMBODIMENTS OF THE INVENTION

An explanation will be specifically made below with reference to the drawings about embodiments of the magnetic recording medium according to the present invention and the magnetic storage apparatus based on the use of the same. In the following embodiments, magnetic disks (hard disks) were manufactured as the magnetic recording media. However, the present invention is also applicable to recording media of the type in which the magnetic head and the magnetic recording medium make contact during the recording or the reproduction, including, for example, flexible disks, magnetic tapes, and magnetic cards.

First Embodiment

Figure 1:
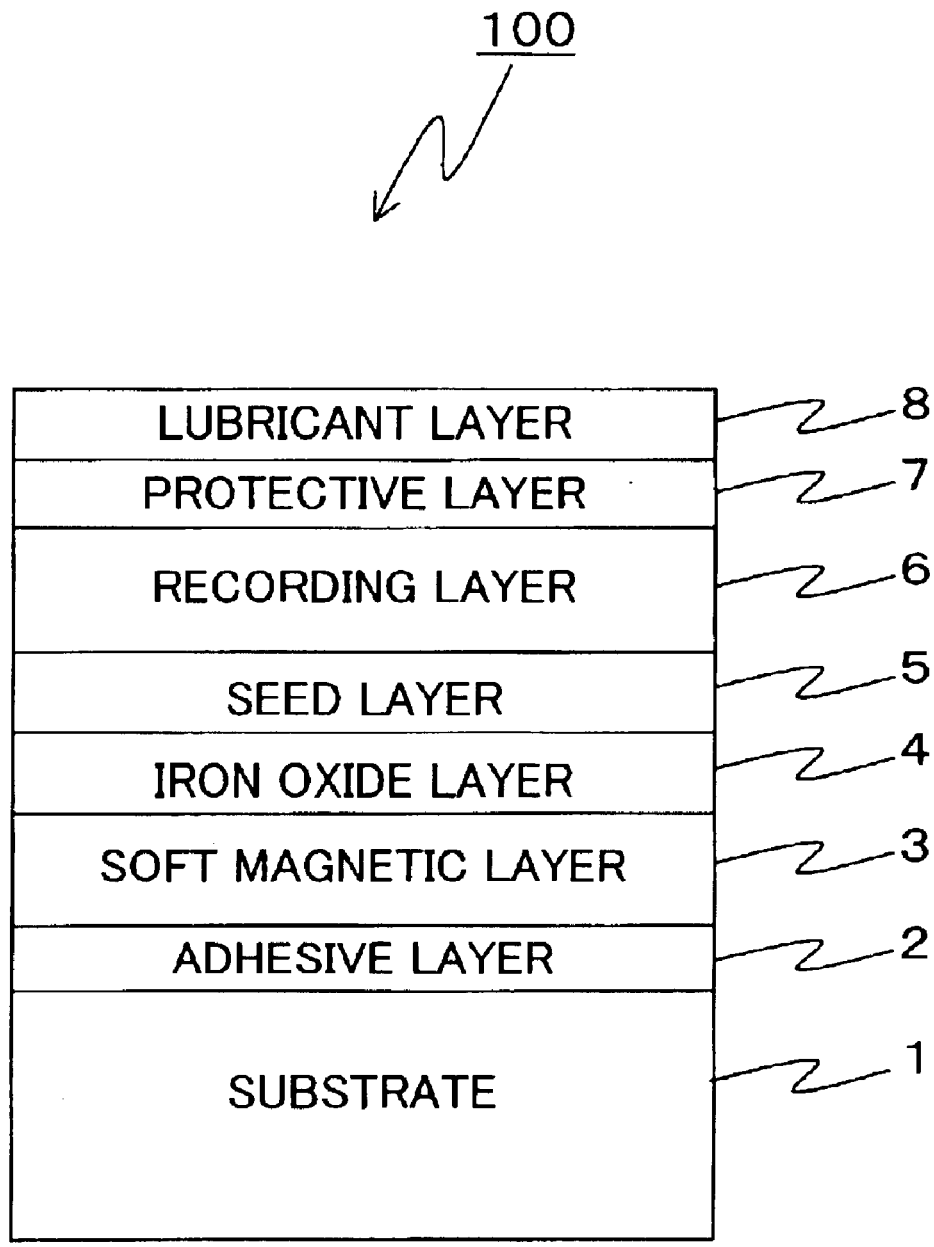
FIG. 1 shows a schematic sectional view illustrating a magnetic recording medium according to the present invention.

FIG. 1 shows a schematic sectional view illustrating a magnetic recording medium according to the present invention. The magnetic recording medium 100 comprises a soft magnetic layer 3, an iron oxide layer 4, a seed layer 5, a recording layer 6, a protective layer 7, and a lubricant layer 8 on a substrate 1 having an adhesive layer 2. The magnetic recording medium 100 having such a stacked structure was produced in accordance with the following method.

At first, a glass substrate 1 having a diameter of 65 mm was prepared, and a film of Ti having a thickness of 5 nm was formed as the adhesive layer 2 on the glass substrate 1 by using a continuous sputtering apparatus.

Subsequently, a film of $Fe_{79}Ta_9C_{12}$ was formed to have a film thickness of 400 nm as the soft magnetic layer 3 on the adhesive layer 2. The formed film of $Fe_{79}Ta_9C_{12}$ was heated at a temperature of 450° C. for 30 seconds by using a carbon heater in vacuum, followed by being gradually cooled. Thus, the soft magnetic layer 3 containing microcrystals of Fe was formed.

Subsequently, the iron oxide layer 4 was formed as a film on the soft magnetic layer 3 with the reactive sputtering method. That is, an Fe target was subjected to DC sputtering while introducing a mixed gas of argon and oxygen (flow rate ratio of oxygen with respect to argon: 20%). The iron oxide layer 4 was formed to have a film thickness of 5 nm with the reactive sputtering as described above.

Subsequently, the substrate 1, on which the iron oxide layer 4 had been formed, was transported to a sputtering chamber to use concentric circular ring targets so that the seed layer 5 was formed as a film on the iron oxide layer 4. When the seed layer 5 was formed, the Pd target and the Si target were subjected to DC sputtering respectively while introducing argon gas into the chamber. Accordingly, the seed layer 5, which was composed of 74 atomic % Pd and 26 atomic % Si, was formed to have a film thickness of 4 nm on the iron oxide layer 4.

Subsequently, the recording layer 6 having the artificial lattice structure was formed as a film on the seed layer 5. The recording layer 6 was formed as follows. That is, DC sputtering was performed in Ar gas while alternately opening/closing the shutter for the Co target and the Pd target to form the recording layer 6 having the artificial lattice structure in which the Co layers and the Pd layers were alternately stacked. One layer of the Co layers had a film thickness of 0.11 nm, and one layer of the Pd layers had a film thickness of 0.92 nm. As for the numbers of the stacked Pd layers and the stacked Co layers, 26 layers were stacked for the Pd layers, and 25 layers were stacked for the Co layers.

Subsequently, the protective layer 7, which was composed of amorphous carbon, was formed to have a film thickness of 3 nm on the recording layer 6 with the plasma CVD method. After forming the protective layer 7, the substrate was retrieved from the film formation apparatus. Finally, a lubricant based on perfluoropolyether was coated by dipping in a lubricant solution to have a thickness of 1 nm on the protective layer 7, and thus the lubricant layer 8 was formed.

Thus, the magnetic recording medium 100 having the stacked structure as shown in FIG. 1 was manufactured.

Figure 2:
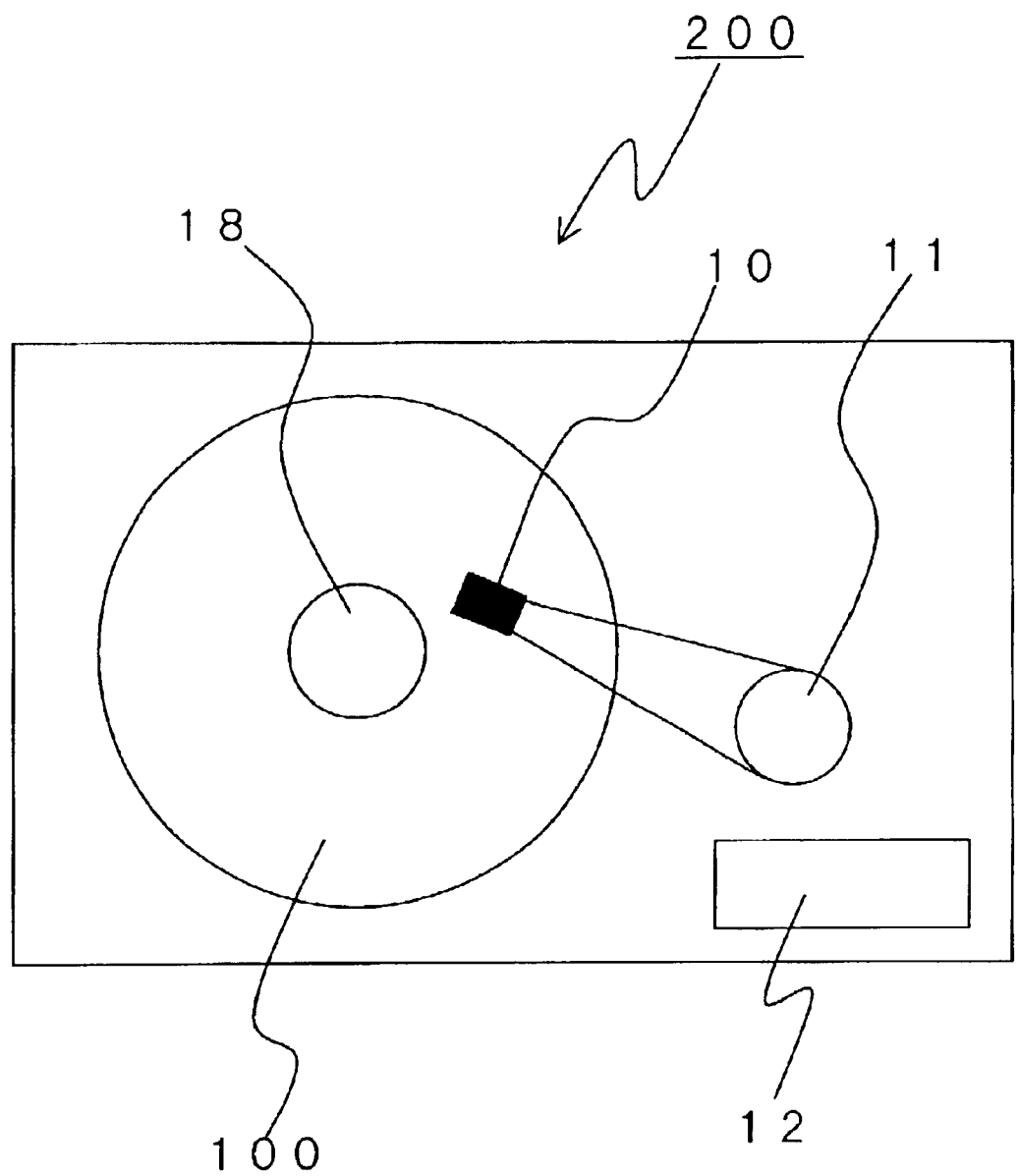
FIG. 2 shows a schematic plan view illustrating a magnetic recording apparatus according to the present invention.

Subsequently, the manufactured magnetic recording medium 100 was incorporated into a magnetic storage apparatus 200 having a planar structure as schematically shown in FIG. 2. The magnetic storage apparatus 200 comprises the magnetic recording medium 100, a rotary drive unit 18 for rotatably driving the magnetic recording medium 100, a magnetic head 10, a head drive unit 11 for moving the magnetic head 10 to a desired position over the magnetic recording medium, and a recording/reproduced signal-processing unit 12. The magnetic head 10 is provided with a single magnetic pole type writing element and a GMR (Giant Magneto-Resistive) reading element, and it is provided at the arm tip of the head drive unit 11. The single magnetic pole type writing element of the magnetic head 10 is capable of recording information on the magnetic recording medium by applying a magnetic field corresponding to data to be recorded on the magnetic recording medium during the recording of information. The GMR reading element of the magnetic head 10 is capable of reproducing information recorded on the magnetic recording medium by detecting the change of leak magnetic field from the magnetic recording medium. The recording/reproduced signal-processing unit 12 is capable of transmitting a recording signal to the single magnetic pole type writing element of the magnetic head 10 by encoding data to be recorded on the magnetic recording medium 100. Further, the recording/reproduced signal-processing unit 12 is capable of decoding the reproduced signal supplied from the magnetic recording medium 100 detected by the GMR reading element of the magnetic head 10.

The magnetic recording apparatus 200 was driven to record information under a condition in which the track recording density was 1000 kBPI and the track density was 150 kTPI while maintaining the magnetic spacing (distance between the main magnetic pole surface of the magnetic head 10 and the recording layer surface of the magnetic recording medium 9) to be 13 nm. The recorded information was reproduced to evaluate the recording and reproduction characteristics. As a result, obtained total S/N was 24.5 dB. Further, as for the recording density, the recording and the reproduction were successfully performed at an areal recording density of 150 Gigabits/square inch. The following head seek test was performed. That is, the magnetic head was subjected to the seek hundred thousand times from the inner circumferential to the outer circumferential over the magnetic recording medium, and the bit error of the magnetic recording medium was measured after the head seek test. As a result, the number of bit errors was not more than 10 bits/surface. The failure interval of three hundred thousand hours was successfully achieved. S/N was determined by using the following expression.

$$S/N = 20\log(S_{0\text{-}p}/N_{rms})$$

In the expression, $S_{0\text{-}p}$ represents the value which is a half of the reproduced signal amplitude from the zero point to the peak (zero to peak), and $N_{rms}$ represents the quadratic square mean of the noise amplitude measured with a spectrum analyzer.

Measurement of Electromagnetic Conversion Characteristics

Figure 4:
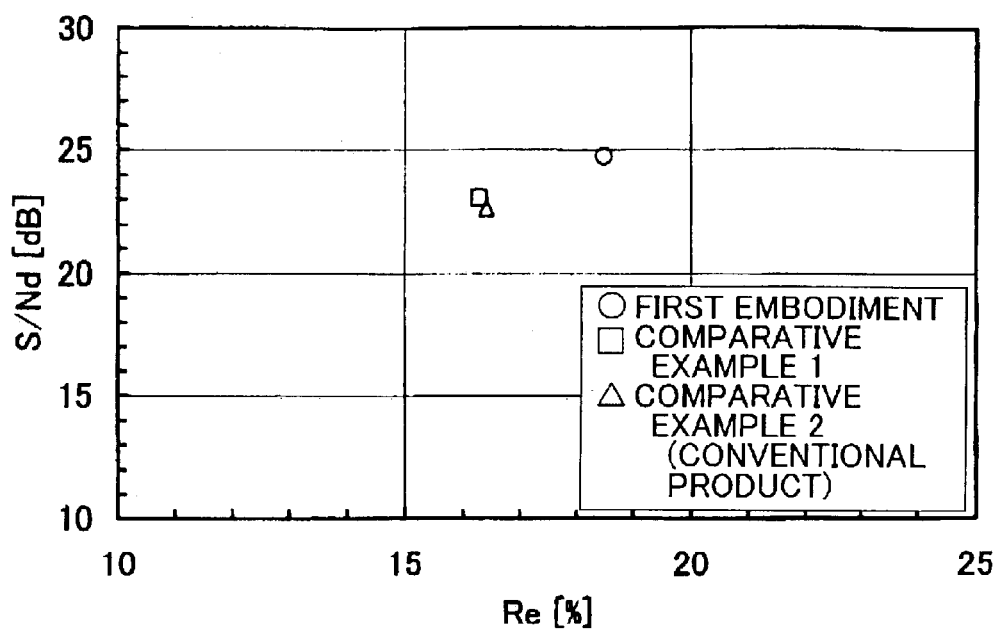
FIG. 4 shows a result of measurement of the electromagnetic conversion characteristic of the magnetic recording medium produced in a first embodiment.

Next, the electromagnetic conversion characteristics were measured with a spin stand playback test machine. A composite type head comprising a single magnetic pole type writing element and a GMR reading element was used as a magnetic head for the playback test machine. The effective writing track width of the main pole of the single magnetic pole type writing element was 110 nm, and Bs was 2.1 T. The effective track width of the GMR element was 97 nm, and the shield spacing was 45 nm. When the playback test was performed, the spacing distance between the main magnetic pole surface of the single magnetic pole writing element of the magnetic head and the recording layer surface of the magnetic recording medium was 13 nm. Results of the measurement of the electromagnetic conversion characteristics are shown in FIG. 4. In FIG. 4, S/Nd represents S/N at 500 kFCI, and Re represents the output resolution obtained by making division by the solitary wave output. For the purpose of comparison, FIG. 4 also shows measurement results of conventional magnetic recording media, i.e., a magnetic recording medium (Comparative Example 1) based on the use of a recording layer composed of a polycrystalline material based on the Co—Cr system, and a recording layer (Comparative Example 2) based on the in-plane magnetic recording system. As clarified from FIG. 4, good S/N is obtained and the resolution is also high, i.e., not less than 18% in the magnetic recording medium manufactured in this embodiment as compared with the conventional magnetic recording media. According to this fact, it is appreciated that the transition noise is reduced even in higher regions, and the high resolution and the high S/N are compatible in the magnetic recording medium of the present invention.

Observation of Cross-sectional Structure of Recording Layer

Figure 3:
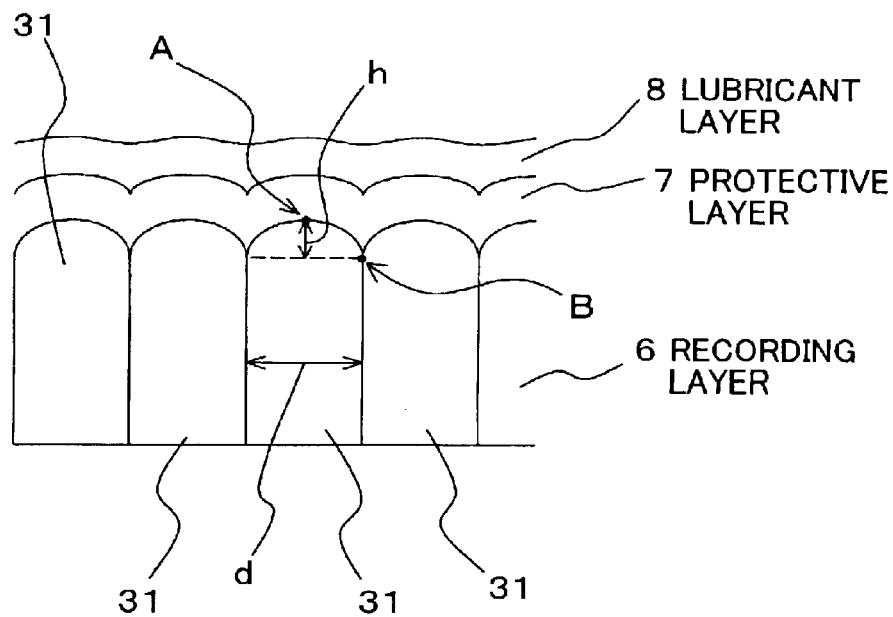
FIG. 3 schematically shows a cross-sectional structure of a recording layer of the magnetic recording medium.

Next, the cross-sectional structure of the magnetic recording medium was observed with a high resolution transmission electron microscope. FIG. 3 schematically shows the result of observation of the cross-sectional structure of the recording layer 6 having the artificial lattice structure. As shown in FIG. 3, the recording layer 6 was composed of an aggregate of columnar crystal grains 31, and the upper surface of each of the crystal grains 31 was hemispherical. The diameter d of the crystal grain was about 8 nm, and the difference h between the uppermost portion A and the lowermost portion B of the hemisphere on the surface of the crystal grain was 2 nm. It is considered that the magnetic coupling force in the in-plane direction is reduced, the minute recording bit is stable, and the linear shape of the magnetization transition area is improved, because the recording layer 6 is composed of the columnar crystal grains as described above.

Measurement of Thermal Demagnetization Ratio

Figure 5:
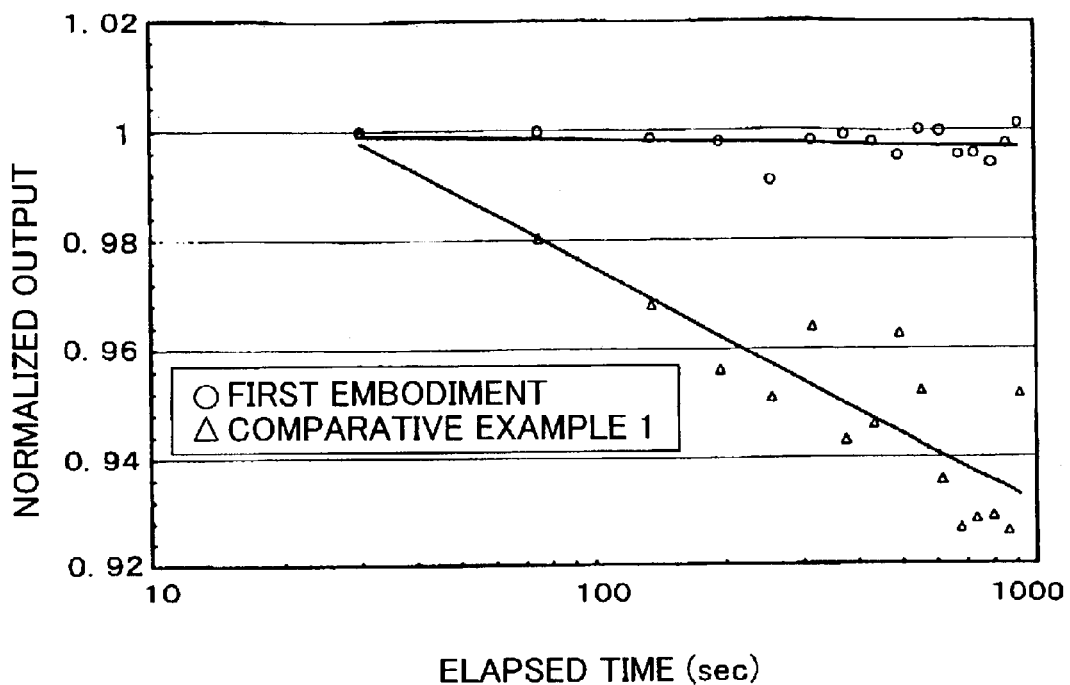
FIG. 5 shows a graph illustrating the reproduced signal output with respect to the time for the magnetic recording medium produced in the first embodiment.

Next, the thermal demagnetization ratio was measured for the magnetic recording medium. The thermal demagnetization ratio was represented by the ratio of the change of the reproduced signal amplitude with respect to the time obtained when the signal having been recorded at a track recording density of 100 kFCI was reproduced in an environment at 24° C. FIG. 5 shows the result of measurement of the thermal demagnetization ratio. For the purpose of comparison, FIG. 5 shows the result of measurement for the magnetic recording medium of Comparative Example 1 as the conventional magnetic recording medium. As shown in FIG. 5, the following fact is appreciated. That is, the normalized output was lowered as the time elapsed in the case of the conventional magnetic recording medium. On the contrary, in the case of the magnetic recording medium of this embodiment, the normalized output was scarcely lowered even when the time elapsed, and there was no thermal demagnetization, probably for the following reason. That is, it is considered that the magnetization transition area of the recording layer is distinct and the linear shape of the magnetization transition area is high in the magnetic recording medium of this embodiment. Further, the error rate was measured at 1000 kBPI on-track. As a result, the error rate was not more than $1 \times 10^{-5}$.

Next, magnetic recording media were manufactured in the same manner as described above except that the Si concentration in the seed layer was changed to 0 atomic %, 4.1 atomic %, 26.0 atomic %, 41.0 atomic %, 50.6 atomic %, and 63.2 atomic % to measure S/Nd and the coercivity of each of the magnetic recording media. Results of the measurement are shown in the following table.

TABLE 1

| Amount of addition of Si in seed layer (atomic %) | S/Nd (dB) | Coercivity (Oe) |
|---|---|---|
| 0.0 | 22.8 | 3130 |
| 4.1 | 21.1 | 2780 |
| 26.0 | 25.0 | 2690 |
| 41.0 | 24.0 | 2690 |
| 50.6 | 22.8 | 2630 |
| 63.2 | 21.1 | 2690 |

As appreciated from the table, S/Nd was not less than 24.0 dB and the coercivity was also satisfactory, i.e., 2690 [Oe] in the case of the magnetic recording media in which the Si concentrations in the seed layers were 26.0 atomic % and 41.0 atomic %. It has been revealed that satisfactory S/Nd and the satisfactory coercivity are obtained provided that the Si concentration in the seed layer of the magnetic recording medium is within a range of 10 atomic % to 50 atomic %.

Second Embodiment

Figure 6:
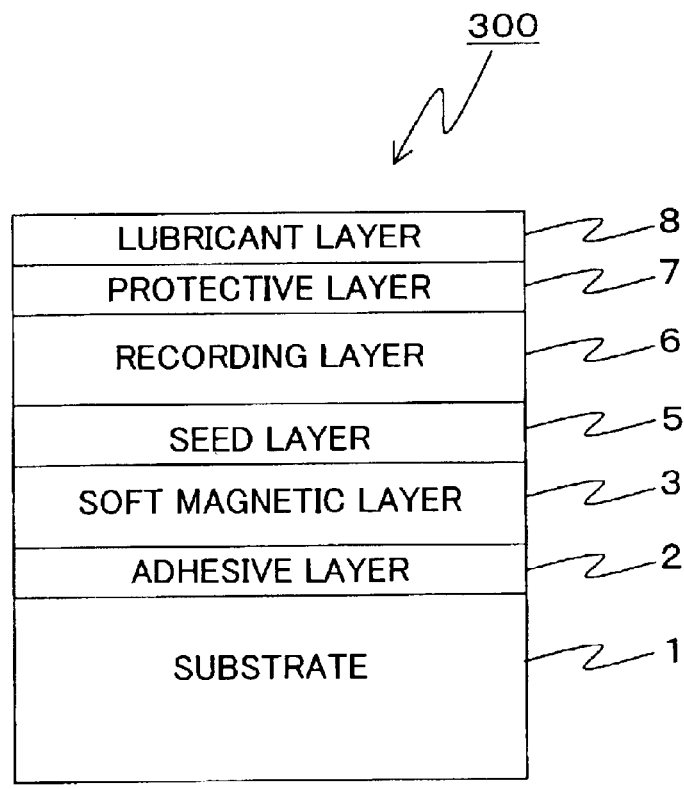
FIG. 6 shows a schematic sectional view illustrating a magnetic recording medium produced in a second embodiment.

FIG. 6 shows a schematic sectional view illustrating a magnetic recording medium of the present invention. The magnetic recording medium 300 comprises a soft magnetic layer 3, a seed layer 5, a recording layer 6, a protective layer 7, and a lubricant layer 8 on a substrate 1 having an adhesive layer 2. In FIG. 6, the layers, which have the same functions as those of the layers for constructing the magnetic recording medium according to the first embodiment shown in FIG. 1, are designated by the same reference numerals. In this embodiment, the seed layer 5 was formed of Pd and B, and the recording layer 6 was formed of an artificial lattice layer obtained by alternately stacking Co layers and PdB layers. An explanation will be made below about a method for producing the magnetic recording medium 300 having the stacked structure as described above.

At first, a glass substrate 1 having a diameter of 65 mm was prepared, and a film of Ti having a thickness of 5 nm was formed as the adhesive layer 2 on the glass substrate 1 by using a continuous sputtering apparatus.

Subsequently, a film of $Fe_{79}Ta_9C_{12}$ was formed to have a film thickness of 400 nm as the soft magnetic layer 3 on the adhesive layer 2. The formed film of $Fe_{79}Ta_9C_{12}$ was heated at a temperature of 450° C. for 30 seconds by using a carbon heater in vacuum, followed by being gradually cooled. Thus, the soft magnetic layer 3 containing microcrystals of Fe was formed.

Subsequently, $Pd_{60}B_{40}$ was formed to have a film thickness of 5 nm as the seed layer 5 on the soft magnetic layer 3. When the seed layer 5 was formed as a film, a Pd target was subjected to DC sputtering while introducing argon gas into a sputtering chamber, and a B target was subjected to RF sputtering.

Subsequently, the artificial lattice layer, in which layers composed of Co and Pd layers containing B (hereinafter referred to as "PdB layers") were alternately stacked, was formed as the recording layer 6 on the seed layer 5. When the artificial lattice layer as described above was formed as a film, then argon gas was introduced into the sputtering chamber, and then only a Co target was subjected to the DC sputtering when the Co layers were formed. On the other hand, when the PdB layers were formed, then the DC sputtering with the Co target was stopped, a Pd target was subjected to the DC sputtering, and a B target was subjected to the RF sputtering. In the artificial lattice layer formed as the film as described above, one layer of the Co layers had a film thickness of 0.16 nm, and one layer of the PdB layers had a film thickness of 0.81 nm. As for the numbers of the stacked Pd layers and the stacked Co layers, the PdB layers were 25 layers, and the Co layers were 25 layers.

In this embodiment, a plurality of magnetic recording media were manufactured by changing the amount of addition of B in the Pd layers of the artificial lattice layer as the recording layer 6 to 5 atomic %, 11 atomic %, and 41 atomic % respectively. A magnetic recording medium, in which B was not contained in the Pd layers of the artificial lattice layer, was also manufactured.

Subsequently, the protective layer 7, which was composed of amorphous carbon, was formed to have a film thickness of 3 nm on the recording layer 6 with the plasma CVD method. After forming the protective layer 7, the substrate was retrieved from the film formation apparatus. Finally, a lubricant based on perfluoropolyether was coated by dipping in a lubricant solution to have a thickness of 1 nm on the protective layer 7, and thus the lubricant layer 8 was formed.

Thus, the magnetic recording medium 300 having the stacked structure as shown in FIG. 6 was manufactured.

Measurement of S/N and Coercivity

Figure 7:
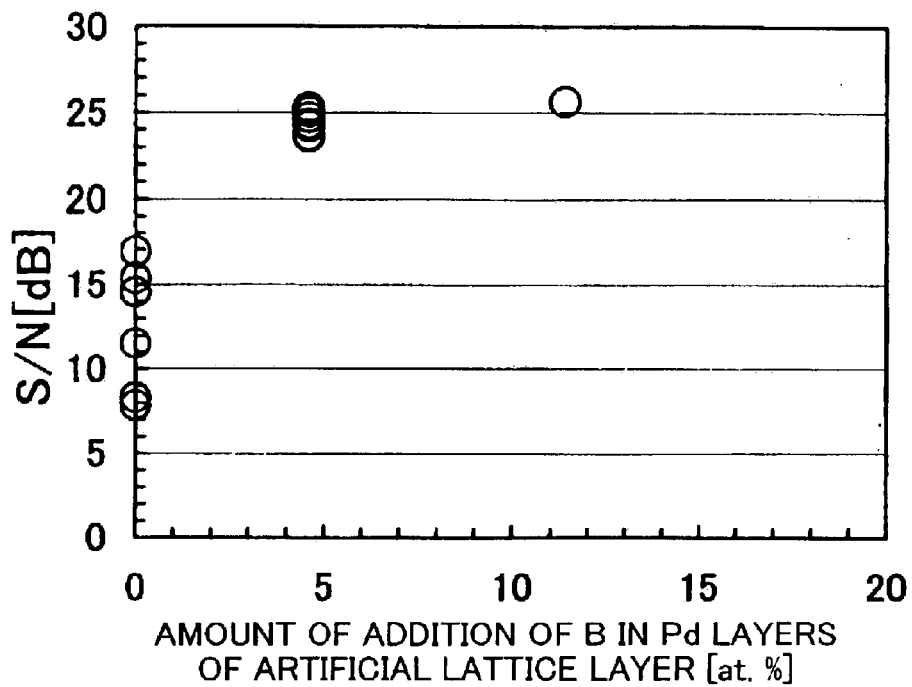
FIG. 7 shows a graph illustrating S/N with respect to the amount of addition of B to a Pd layer of a recording layer of the magnetic recording medium.
Figure 8:
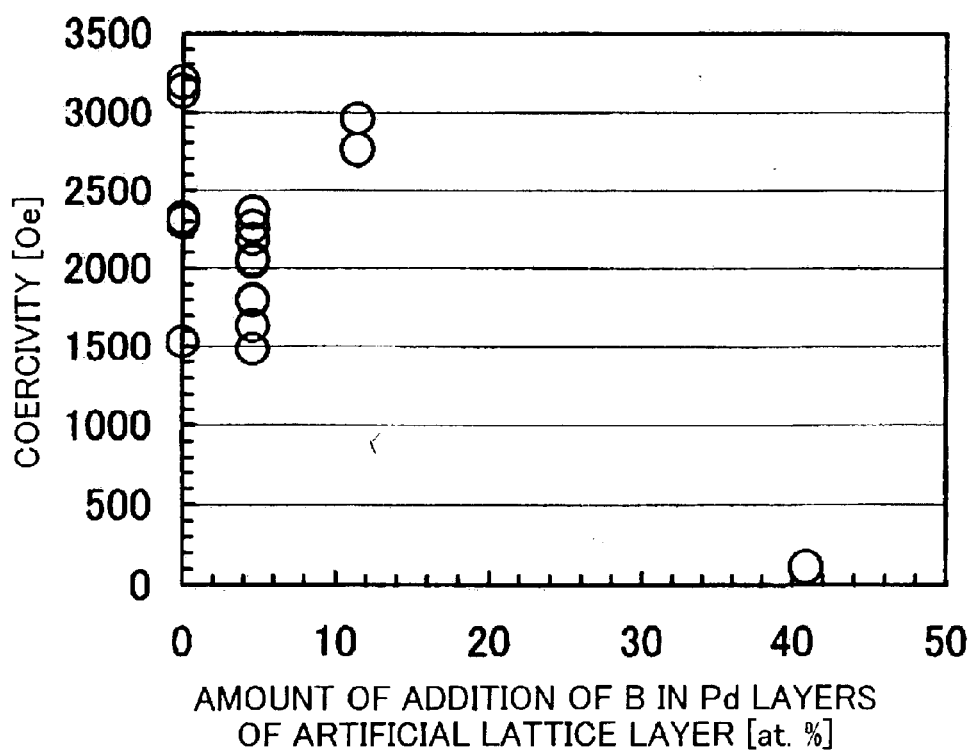
FIG. 8 shows a graph illustrating the coercivity with respect to the amount of addition of B to the Pd layer of the recording layer of the magnetic recording medium.

Next, S/N and the coercivity were measured for the respective magnetic recording media manufactured by changing the amount of addition of B in the Pd layers of the artificial lattice layer. Results of the measurement are shown in graphs in FIGS. 7 and 8 respectively. As appreciated from the graph shown in FIG. 7, S/N was increased in the magnetic recording media in which the amount of addition of B in the Pd layers was 5 atomic % and 11 atomic %, as compared with the magnetic recording medium in which B was not added to the Pd layers of the artificial lattice layer. As depicted in the graph shown in FIG. 8, the coercivity was high, i.e., not less than 1500 [Oe] in the magnetic recording media in which the amount of addition of B in the Pd layers of the artificial lattice layer was 5 atomic % and 11 atomic %. Especially, the coercivity of not less than 2700 [Oe] was successfully obtained in the magnetic recording medium in which the amount of addition of B was 11 atomic %. On the other hand, the coercivity was low, i.e., not more than 200 [Oe] in the magnetic recording medium in which the amount of addition of B in the Pd layers of the artificial lattice layer was 41 atomic %.

Next, magnetic recording media were manufactured in the same manner as described above except that the amount of addition of B in the seed layer was changed to 10.8 atomic %, 40.7 atomic %, 50.9 atomic %, and 63.6 atomic % to measure S/Nd and the coercivity of each of the magnetic recording media. Results of the measurement are shown in the following table.

TABLE 2

| Amount of addition of B in seed layer (atomic %) | S/Nd (dB) | Coercivity (Oe) |
|---|---|---|
| 10.8 | 11.7 | 4963 |
| 40.7 | 25.6 | 2758 |

TABLE 2-continued

| Amount of addition of B in seed layer (atomic %) | S/Nd (dB) | Coercivity (Oe) |
|---|---|---|
| 50.9 | 24.2 | 2001 |
| 63.6 | 7.8 | 1317 |

As appreciated from the table, S/Nd was not less than 24.2 dB and the coercivity was also satisfactory, i.e., not less than 2001 [Oe] in the case of the magnetic recording media in which the amount of addition of B in the seed layers were 40.7 atomic % and 50.9 atomic %. It has been revealed that satisfactory S/Nd and the satisfactory coercivity are obtained provided that the amount of addition of B in the seed layer of the magnetic recording medium is within a range of 20 atomic % to 60 atomic %.

Third Embodiment

A magnetic recording medium was manufactured in the same manner as in the second embodiment except that a seed layer was formed with PdC, and a recording layer formed as an artificial lattice layer obtained by alternately stacking Co layers and PdC layers. The method for forming the seed layer was the same as that used in the second embodiment except that a C (carbon) target was used in place of the B (boron) target. The seed layer of $Pd_{67}C_{33}$ was formed to have a film thickness of 5 nm. As for the Co/PdC artificial lattice layer as the recording layer, one layer of the Co layers had a film thickness of 0.16 nm, and one layer of the PdC ($Pd_{88}C_{12}$) layers had a film thickness of 0.80 nm. The numbers of stacked layers were 25 for both of the Co layers and the PdC layers.

The electromagnetic conversion characteristics were measured for the magnetic recording medium in the same manner as in the first embodiment. As a result of the measurement, S/Nd=24.7 dB and Re=18.6% were obtained. Both of S/Nd and Re were satisfactory.

Fourth Embodiment

In this embodiment, a magnetic recording medium was manufactured in the same manner as in the first embodiment except that an iron oxide layer had a film thickness of 2 nm, a seed layer was formed with PdZr, and a recording layer was an artificial lattice layer obtained by alternately stacking Co layers and PdZr layers. When the seed layer was formed as a film, then argon was used as sputtering gas, and a $Pd_{90}Zr_{10}$ target was subjected to DC sputtering. The seed layer had a film thickness of 5 nm. When the recording layer was formed as a film, then argon gas was used as sputtering gas, and a Co target and a $Pd_{90}Zr_{10}$ target were subjected to DC sputtering while alternately opening/closing shutters for the Co target and the $Pd_{90}Zr_{10}$ target. One layer of the Co layers of the recording layer had a film thickness of 0.17 nm, and one layer of the PdZr layers had a film thickness of 0.85 nm. The numbers of stacked layers were 25 for both of the Co layers and the PdZr layers.

The electromagnetic conversion characteristics were measured for the magnetic recording medium in the same manner as in the first embodiment. As a result of the measurement, S/Nd=25.7 dB and Re=18.1% were obtained. Both of S/Nd and Re were satisfactory.

Fifth Embodiment

Figure 9:
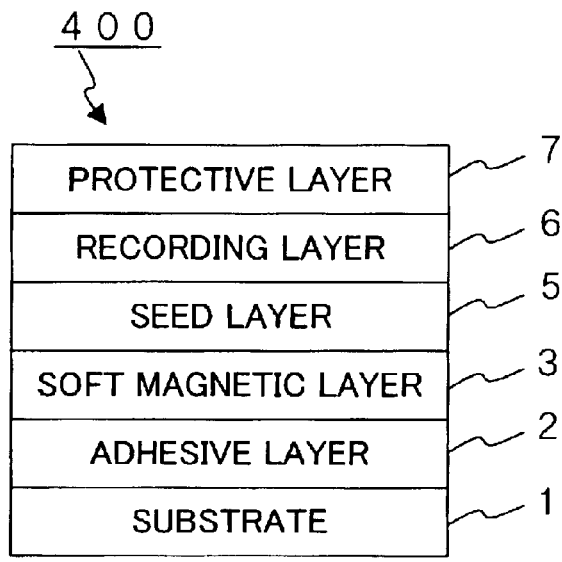
FIG. 9 shows a schematic sectional view illustrating a magnetic disk manufactured in a fifth embodiment.

A schematic sectional view of a magnetic disk 400 manufactured in this embodiment is shown in FIG. 9. As shown in FIG. 9, the magnetic disk 400 was manufactured by successively stacking, on a substrate 1, an adhesive layer 2, a soft magnetic layer 3, a seed layer 5, a recording layer 6, and a protective layer 7.

A glass substrate having a diameter of 2.5 inches (6.25 cm) was prepared as the substrate 1. A Ti film to serve as the adhesive layer 2 was formed thereon with the DC magnetron sputtering method in an Ar gas atmosphere. The adhesive layer 2 had a film thickness of 5 nm.

Subsequently, a CoB film to serve as the soft magnetic layer 3 was formed on the adhesive layer 2 with the DC magnetron sputtering method by using a $Co_{85}B_{15}$ alloy target in an Ar gas atmosphere. The soft magnetic layer 3 had a film thickness of 200 nm.

Further, a PdB film to serve as the seed layer 5 was formed on the soft magnetic layer 3. The film was formed by using the co-sputtering method in an Ar gas atmosphere. The DC magnetron sputtering method was used for Pd, and the RF magnetron sputtering method was used for B, while making adjustment so that the composition of the seed layer 5 was $Pd_{67}B_{33}$. The seed layer 5 had a film thickness of 4 nm.

A CoB/PdB alternate multilayer film, which exhibited the perpendicular magnetization to serve as the recording layer 6, was formed on the seed layer 5 having been formed as described above. The CoB/PdB alternate multilayer film was formed in accordance with the following method. That is, the DC magnetron sputtering was performed while alternately opening/closing the shutter for opening/closing the Co target and the Pd target in an Ar gas atmosphere to alternately stack magnetic layers principally composed of Co and metal layers principally composed of Pd so that the multilayer film was formed. In this embodiment, 25 layers of the Co layers each having a thickness of 0.14 nm and 25 layers of the Pd layers each having a thickness of 0.94 nm were stacked. B was subjected to the co-sputtering in accordance with the RF magnetron sputtering method during the formation of the alternate multilayer film so that B was contained in the multilayer film. In this procedure, the content of B in the recording layer 6 was adjusted to 12 atomic %.

Finally, a C film to serve as the protective layer 7 was formed on the recording layer 6 with the RF magnetron sputtering method in an Ar gas atmosphere. The protective layer 7 had a film thickness of 3 nm.

The structure of the magnetic disk manufactured in this embodiment was analyzed by a high resolution transmission electron microscope (TEM). Although the result of the analysis with TEM is not shown, the crystal grains and the crystal grain boundary of the recording layer were clearly observed according to the in-plane TEM observation. According to an image of High-Angle Annular Dark-Field microscopy (HAADF-STEM image), it was successfully confirmed that a large amount of light element exists at the crystal grain boundary of the recording layer, and it was revealed that B was segregated at the crystal grain boundary of the recording layer.

Figure 10:
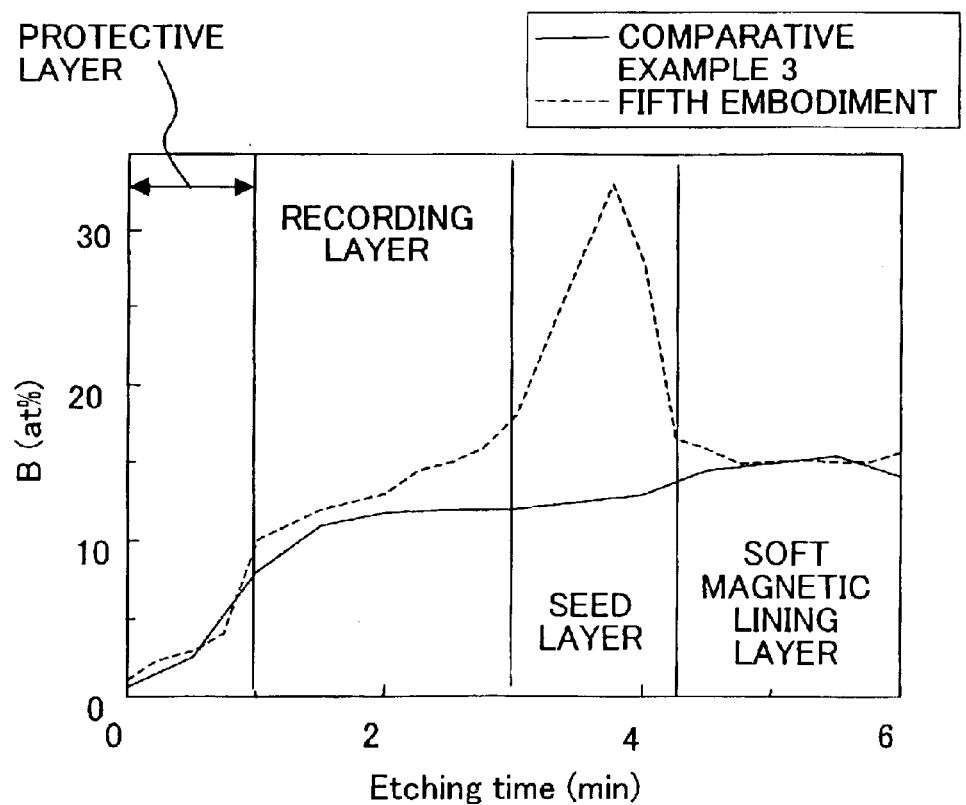
FIG. 10 shows the distributions of B concentration in the film thickness direction in magnetic disks manufactured in the fifth embodiment and Comparative Example 3.

Next, the distribution in the film thickness direction of the concentration of B contained in the magnetic disk manufactured in this embodiment was analyzed with the X-ray Photoelectron Spectroscopy (XPS). An obtained result is shown in FIG. 10. The broken line shown in FIG. 10 represents the distribution of the B concentration in the film thickness direction in the magnetic disk of the fifth embodiment. However, in this experiment, the etching and the measurement of the B concentration by means of XPS were repeatedly performed from the side of the protective layer to investigate the distribution of the B concentration in the film thickness direction. Therefore, the horizontal axis in FIG. 10 is represented by the etching time. As shown in FIG. 10, the period of etching time of 0 to about 1 minute corresponds to the area of the protective layer, the period of etching time of about 1 to about 3 minutes corresponds to the area of the recording layer, the period of etching time of about 3 to about 4.25 minutes corresponds to the area of the seed layer, and the period of etching time of about 4.25 minutes and the followings corresponds to the area of the soft magnetic layer.

As shown in FIG. 10, the B concentration is decreased in the direction directed from the boundary surface between the recording layer and the seed layer toward the boundary surface between the recording layer and the protective layer, in the recording layer of the magnetic disk manufactured in the fifth embodiment. The gradient of B concentration is generated in the film thickness direction in the recording layer, probably for the following reason. That is, it is considered that a part of B contained in the seed layer is diffused to the recording layer during the film formation of the recording layer. The B concentration is 17.0 atomic % at a position in the vicinity of the boundary surface between the recording layer and the seed layer, at which the amount of diffusion of B is increased and the B concentration is large because the position is near to the seed layer, as compared with the B concentration of 12.5 atomic % at an intermediate position between the boundary surface of the recording layer on the side of the seed layer and the boundary surface of the recording layer on the side of the protective layer. However, the distance of separation from the seed layer is increased in the direction directed from the boundary surface between the recording layer and the seed layer toward the protective layer. Therefore, the amount of diffusion of B is decreased, and the B concentration is small. The B concentration at the position in the vicinity of the boundary surface between the recording layer and the seed layer was determined with a point of intersection between a tangent line of the B concentration distribution curve at a position of the measurement of the B concentration at an etching time of 3.2 minutes on the side of the seed layer and a tangent line of the B concentration distribution curve at a position of the measurement of the B concentration at an etching time of 2.8 minutes on the side of the recording layer. On the other hand, the B concentration at the intermediate position between the boundary surface of the recording layer on the side of the seed layer and the boundary surface of the recording layer on the side of the protective layer was determined in accordance with the following method. That is, at first, the B concentration at a position in the vicinity of the boundary surface between the protective layer and the recording layer was determined in accordance with the same method as that used to determine the B concentration at the position in the vicinity of the boundary surface between the recording layer and the seed layer. Subsequently, the intermediate position in the recording layer was determined on the basis of the both boundary surfaces. Thus, the B concentration at the intermediate position in the recording layer was determined from the positions of the both boundary surfaces of the recording layer, the B concentrations, and the intermediate position.

In the magnetic disk manufactured in this embodiment, the average B concentration of the recording layer after the film formation was 15 atomic %, and the average B concentration of the seed layer was 28 atomic %. In the seed layer, a part of B diffuses and outflows to the recording layer. Therefore, the average B concentration of the seed layer after the film formation is smaller than the content of B (33 atomic %) in the material for forming the seed layer upon the film formation. On the other hand, in the recording layer, B inflows by the diffusion from the seed layer. Therefore, the average B concentration of the recording layer after the film formation is larger than the content of B (12 atomic %) in the material for forming the recording layer upon the film formation.

Next, a lubricant (not shown) was applied onto the protective layer 7 of the magnetic disk 400 manufactured in this embodiment, and then the recording and reproduction characteristics of the magnetic disk 400 were evaluated. A single magnetic pole head suitable for the perpendicular magnetic recording was used for the recording, and a spin bulb type GMR magnetic head was used for the reproduction. The distance between the magnetic head surface and the magnetic disk surface was maintained to be 10 nm. As a result of the evaluation of the magnetic disk 400, Slf/Nd= 23.1 was obtained. Slf represents the reproduction output obtained when a signal having a track recording density of 20 kFCI is recorded, and Nd represents the noise level obtained when a signal having a track recording density of 450 kFCI is recorded. Slf/Nd serves as an index for the signal to noise ratio of the medium.

Further, the magnetic disk 400 manufactured in this embodiment was incorporated into a magnetic recording apparatus to evaluate the recording and reproduction characteristics.

The magnetic disk 400 manufactured in this embodiment was installed to the magnetic recording apparatus to perform a playback test for the magnetic disk 400. In this experiment, a signal corresponding to 60 Gbits/inch$^2$ was recorded on the magnetic disk 400. The distance between the magnetic head surface of the magnetic recording apparatus and the surface of the magnetic disk 400 was maintained to be 10 nm. As a result of the playback test, a reproduced signal having a signal to noise ratio S/N=30 dB was obtained. The error rate was not more than $1\times10^{-5}$ when no signal processing was performed.

COMPARATIVE EXAMPLE 3

In Comparative Example 3, comparison is made with the fifth embodiment. In Comparative Example 3, a magnetic disk was manufactured in the same manner as in the fifth embodiment except that the disk was manufactured by controlling the content of B upon the film formation of the seed layer so that the content of B was 12 atomic % in the material for forming the seed layer, i.e., Pd:B=88:12 was given. The content of B in the seed layer is the same as the content of B upon the film formation of the recording layer.

The distribution of the B concentration contained in the magnetic disk manufactured in this example was analyzed with the X-ray Photoelectron Spectroscopy (XPS) in the same manner as in the fifth embodiment. An obtained result is shown in FIG. 10. The solid line in FIG. 10 represents the distribution in the film thickness direction of the B concentration in the magnetic disk of Comparative Example 3. As shown in FIG. 10, the gradient of the B concentration in the recording layer scarcely appeared in the magnetic disk manufactured in this example as compared with the result of the fifth embodiment (broken line in FIG. 10), probably for the following reason. That is, it is considered that the diffusion of B from the seed layer to the recording layer was not caused during the film formation of the recording layer, because the value of the B content upon the film formation of the seed layer was the same as that of the recording layer. When the result of the fifth embodiment was compared with the result of Comparative Example 3 for the B concentration in the recording layer, as shown in FIG. 10, the B concentration in the recording layer of the magnetic disk manufactured in the fifth embodiment was larger than that of the magnetic disk manufactured in Comparative Example 3. It is considered that the difference in concentration is equivalent to the amount of diffusion of B diffused from the seed layer to the recording layer.

Slf/Nd was measured for the magnetic disk manufactured in this example in the same manner as in the fifth embodiment. An obtained result is shown in Table 3 together with the result of the fifth embodiment. In Table 3, Br represents the B content upon the film formation of the recording layer, Bs represents the B content upon the film formation of the seed layer, B1 represents the B concentration at the position in the vicinity of the boundary surface between the recording layer and the seed layer after the film formation, and B2 represents the B concentration at the intermediate position between the boundary surface of the recording layer on the side of the seed layer and the boundary surface of the recording layer on the side of the protective layer after the film formation.

TABLE 3

| | Slf/Nd (dB) | Bs (atomic %) | Br (atomic %) | B1 (atomic %) | B2 (atomic %) |
| --- | --- | --- | --- | --- | --- |
| Fifth embodiment | 23.1 | 33.0 | 12.0 | 17.0 | 12.5 |
| Comp. Ex. 3 | 18.1 | 12.0 | 12.0 | 12.0 | 11.0 |

In the magnetic disk manufactured in Comparative Example 3, Slf/Nd=18.1 dB was obtained as shown in Table 3, which was a value lower than that of the magnetic disk of the fifth embodiment, probably for the following reason. That is, it is considered that the diffusion of B from the seed layer to the recording layer was scarcely caused, and the segregation of B at the crystal grain boundary in the recording layer was not facilitated, because the value of the B content in the seed layer was the same as that of the recording layer. Therefore, the following fact may be affirmed. That is, when the B content upon the film formation of the seed layer is made to be sufficiently larger than that of the recording layer as in the fifth embodiment, then B is diffused from the seed layer to the recording layer, the aggregation of B at the crystal grain boundary of the recording layer is facilitated, and the transition noise is reduced. Accordingly, Slf/Nd is increased.

Sixth Embodiment

In the sixth embodiment, a variety of magnetic disks were manufactured in the same manner as in the fifth embodiment except that the magnetic disks were manufactured by changing the B content in the seed layer within a range of 33.0 to 100.0 atomic % and the B content in the recording layer within a range of 5.0 to 15.0 atomic % respectively upon the film formation for the magnetic disks.

Slf/Nd was measured for the variety of magnetic disks manufactured in this embodiment in the same manner as in the fifth embodiment. An obtained result is shown in Table 4. In Table 4, Br represents the B content upon the film formation of the recording layer, Bs represents the B content upon the film formation of the seed layer, B1 represents the B concentration at the position in the vicinity of the boundary surface between the recording layer and the seed layer after the film formation, and B2 represents the B concentration at the intermediate position between the boundary surface of the recording layer on the side of the seed layer and the boundary surface of the recording layer on the side of the protective layer after the film formation. The results of the fifth embodiment and Comparative Example 3 are also shown in Table 4 together.

TABLE 4

| Bs (atomic %) | Br (atomic %) | B1 (atomic %) | B2 (atomic %) | Slf/Nd (dB) |
| --- | --- | --- | --- | --- |
| 12.0 (Comp. Ex. 3) | 12.0 | 12.0 | 11.0 | 18.1 |
| 33.0 (Fifth embodiment) | 12.0 | 17.0 | 12.5 | 23.1 |
| 33.0 | 5.0 | 18.0 | 6.0 | 22.3 |
| 33.0 | 15.0 | 20.0 | 17.0 | 22.0 |
| 50.0 | 10.0 | 30.0 | 10.3 | 26.0 |
| 100.0 | 5.0 | 70.0 | 8.5 | 24.2 |
| 100.0 | 15.0 | 60.0 | 17.0 | 23.5 |

As shown in Table 4, it has been revealed that Slf/Nd of not less than 22.0 dB is obtained when the B content Bs upon the film formation of the seed layer is 33.0 to 100.0 atomic %, the B content Br upon the film formation of the recording layer is 5.0 to 15.0 atomic %, and the difference in content between Bs and Br is 18.0 to 95.0 atomic %. On this condition, B1 in the recording layer of the magnetic disk was 18.0 to 60.0 atomic %, and B2 was 7.0 to 17.0 atomic %.

The magnetic recording medium of the present invention has been specifically explained above. However, the present invention is not limited thereto, which may include a variety of alterations and modifications.

In the magnetic recording medium of the present invention, it is possible to reduce the magnetic coupling force in the in-plane direction of the recording layer, because the seed layer, which is composed of Pd and at least one of Si, Al, Zr, Ti, and B, is used as the underlying base of the recording layer having the artificial lattice structure. Accordingly, the disturbance in the magnetization transition area of the recording layer is reduced. Therefore, information can be reproduced at a low noise level even when the track recording density is raised. Further, the magnetic recording medium has high thermal stability, because the artificial lattice film having high magnetic anisotropy is used as the recording layer.

According to the method for producing the magnetic recording medium of the present invention, the content of B in the seed layer upon the film formation is made to be sufficiently larger than the content of B in the recording layer. Thus, a part of B in the seed layer is diffused to the recording layer, the segregation of B at the crystal grain boundary in the recording layer is facilitated, and it is possible to further reduce the magnetic interaction between the crystal grains in the recording layer. Accordingly, it is possible to provide the magnetic recording medium in which the medium noise is reduced and information can be reproduced at high S/N.

The magnetic storage apparatus of the present invention is provided with the magnetic recording medium of the present invention. Therefore, even when information is recorded at a high areal recording density of 150 Gigabits/square inch (about 23.25 Gigabits/square centimeter), the information can be reproduced at high S/N. Further, the magnetic storage apparatus of the present invention has high thermal demagnetization resistance characteristics.

What is claimed is:

1. A magnetic recording medium comprising:
   a substrate,
   a seed layer which is formed directly or indirectly on the substrate, and which is formed of Pd and at least one selected from the group consisting of Si, B, C and Zr; and
   a magnetic recording layer which is formed directly on the seed layer, and which is formed by alternately stacking a Co layer and a platinum group layer composed of at least one of Pt and Pd and is further composed of at least one selected from the group consisting of C and Zr.

2. A magnetic recording medium comprising:
   a substrate;
   a seed layer which is formed directly or indirectly on the substrate, and which is formed of Pd and at least one selected from the group consisting of Si, B, C and Zr; and
   a magnetic recording layer which is formed directly on the seed layer and which is formed by alternately stacking a Co layer and a platinum group layer composed of at least one of Pt and Pd and is further composed of at least one selected from the group consisting of C and Zr, the magnetic recording layer containing no oxygen.

3. The magnetic recording medium according to claim 1, wherein the seed layer is formed of 50 atomic % to 90 atomic % Pd and 10 atomic % to 50 atomic % Si.

4. The magnetic recording medium according to claim 1, wherein the seed layer is formed of 40 atomic % to 80 atomic % Pd and 20 atomic % to 60 atomic % B.

5. The magnetic recording medium according to claim 1, wherein the seed layer has a microcrystalline structure or a crystalline structure including amorphous parts.

6. The magnetic recording medium according to claim 1, wherein the seed layer has a film thickness within a range of 1 nm to 30 nm.

7. The magnetic recording medium according to claim 1, wherein the recording layer has an artificial lattice structure and exhibits perpendicular magnetism, and the magnetic recording medium comprises a soft magnetic layer which is disposed between the substrate and the seed layer.

8. The magnetic recording medium according to claim 7, wherein the soft magnetic layer has a structure in which a nitride or a carbide of at least one element selected from the group consisting of Ta, Nb, and Zr is dispersed in Fe.

9. The magnetic recording medium according to claim 7, wherein the soft magnetic layer is formed by using an amorphous alloy which is mainly composed of Co—Zr and which contains at least one element selected from the group consisting of Ta, Nb, and Ti therein.

10. The magnetic recording medium according to claim 7, further comprising an oxide layer containing iron oxide which is disposed between the soft magnetic layer and the seed layer.

11. The magnetic recording medium according to claim 10, wherein the oxide layer has a film thickness of not more than 30 nm.

12. The magnetic recording medium according to claim 1, wherein the recording layer is an artificial lattice layer composed of Co layers and Pd layers or an artificial lattice layer composed of Co layers and Pt layers, and Co is distributed discontinuously in a direction parallel to a substrate surface.

13. The magnetic recording medium according to claim 1, wherein at least one element selected from the group consisting of Si, C, and Zr is contained in either the Co layer or else the Co layer and the platinum group layer.

14. The magnetic recording medium according to claim 1, wherein the recording layer is an artificial lattice layer which is formed by alternately stacking a Pd layer and a Co layer and which contains no oxygen, the artificial lattice layer containing B and having the Pd/B atomic ratio of 60/40 to 90/10.

15. The magnetic recording medium according to claim 1, wherein the recording layer is composed of an aggregate of crystal grains, each of the crystal grains extends in a columnar form in a direction perpendicular to a surface of the substrate with a tip of the crystal grain being bulged on a recording layer surface, the crystal grain has a diameter within a range of 2 nm to 15 nm, and the crystal grain is bulged at a height of 1 nm to 10 nm.

16. The magnetic recording medium according to claim 12, wherein the recording layer is a Co/Pd artificial lattice layer formed by alternately stacking Co layers each having a film thickness within a range of 0.05 nm to 0.5 nm and Pd layers each having a film thickness within a range of 0.5 nm to 2 nm.

17. The magnetic recording medium according to claim 12, wherein the recording layer is a Co/Pt artificial lattice layer formed by alternately stacking Co layers each having a film thickness within a range of 0.05 nm to 0.5 mu and Pt layers each having a film thickness within a range of 0.1 nm to 2 nm.

18. A magnetic recording medium comprising:
    a substrate;
    a seed layer which is formed directly or indirectly on the substrate, and which contains Pd and B; and
    a magnetic recording layer which is formed directly on the seed layer, and which contains B, and at least one of Pt and Pd,
    wherein an average concentration of B in the seed layer is higher than an average concentration of B in the recording layer, and a relationship of B1>B2 holds between a B concentration B1 at a boundary surface of the recording layer on a side of the seed layer and a B concentration B2 at an intermediate position between the boundary surface of the recording layer on the side of the seed layer and a boundary surface of the recording layer on a side opposite to the side of the seed layer.

19. The magnetic recording medium according to claim 18, wherein the B concentration B1 is 17.0 to 70.0 atomic %, and the B concentration B2 is 6.0 to 17.0 atomic %.

20. The magnetic recording medium according to claim 18, wherein a concentration gradient of B of 0.2 to 4.2 atomic %/nm is provided in a film direction perpendicular to a substrate surface in the recording layer.

21. A method for producing a magnetic recording medium, comprising:
    forming a seed layer containing Pd and at least one selected from a group consisting of Si, B, C and Zr directly or indirectly on a substrate; and
    forming a magnetic recording layer by alternately stacking a Co layer and a platinum group layer composed of at least one of Pt and Pd directly on the seed layer Pd, the platinum group layer further including at least one selected from the group consisting of C and Zr.

22. The method for producing the magnetic recording medium according to claim 21, wherein the seed layer contains Pd and B, and the recording layer contains B, and a condition of Bs>Br holds between a B content Bs in a material for forming the seed layer and a B content Br in a material for forming the recording layer.

23. A magnetic storage apparatus comprising:
- the magnetic recording medium as defined claim 1;
- a magnetic head which records or reproduces information; and
- a drive unit which drives the magnetic recording medium with respect to the magnetic head.

24. The magnetic storage apparatus according to claim 23, wherein the magnetic head includes a magneto-resistance effect magnetic head.

* * * * *